(12) United States Patent
Nieves Bogonez et al.

(10) Patent No.: US 12,710,118 B1
(45) Date of Patent: Aug. 18, 2026

(54) CORROSION-FREE WELDING CONNECTION FOR REINFORCED THERMOPLASTIC PIPES (RTP)

(71) Applicant: SAUDI ARABIAN OIL COMPANY, Dhahran (SA)

(72) Inventors: Francisco Daniel Nieves Bogonez, Claverham (GB); Abderrazak Traidia, Lussan (FR); Thibault Villette, Belfort (FR)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/055,978

(22) Filed: Feb. 18, 2025

(51) Int. Cl.
*F16L 23/02* (2006.01)
*F16L 23/028* (2006.01)
*F16L 33/22* (2006.01)

(52) U.S. Cl.
CPC ........... *F16L 23/02* (2013.01); *F16L 23/0286* (2013.01); *F16L 33/22* (2013.01)

(58) Field of Classification Search
CPC ....... F16L 23/0286; F16L 23/02; F16L 33/22; F16L 33/222; F16L 33/225; F16L 21/007; F16L 2201/30
See application file for complete search history.

(56) References Cited

U.S. PATENT DOCUMENTS

| | | | | |
|---|---|---|---|---|
| 170,473 | A | 11/1875 | Flagler et al. | |
| 1,887,877 | A * | 11/1932 | Shaffer | F16L 33/222 |
| 2,787,480 | A * | 4/1957 | Staller | F16L 33/22 |
| 3,002,871 | A | 10/1961 | Franz et al. | |

(Continued)

FOREIGN PATENT DOCUMENTS

| | | | |
|---|---|---|---|
| CN | 107228248 | A | 10/2017 |
| DE | 19911284 | A1 | 9/2000 |

(Continued)

OTHER PUBLICATIONS

R.F. Hamade, et al., "Rotary Friction Welding versus Fusion Butt Welding of Plastic Pipes- Feasibility and Engergy Perspective," Procedia Manufacturing, 2019 (8 pages).

(Continued)

*Primary Examiner* — William S. Choi

(74) *Attorney, Agent, or Firm* — Osha Bergman Watanabe & Burton LLP

(57) ABSTRACT

System and method for a connection system including a coupler disposed internally between a first pipe and a second pipe, a set of wedges positioned circumferentially around an outer surface of each of the first and second pipe, and a spacer positioned circumferentially around the coupler and disposed between the wedges on the first and second pipe. The system further includes an external ferrule disposed circumferentially around each set of wedges and a venting port connecting one connection chamber in a perimetric channel of the spacer to an outside environment. The venting port collects and canalizes any leaked fluid existing in an annulus between an inner thermoplastic liner and an external thermoplastic jacket of the first pipe and the second pipe or existing in an area between the first pipe, the spacer, and the second pipe. The venting port further includes an instrumentation port for sensing leaking fluid.

20 Claims, 10 Drawing Sheets

(56) References Cited

U.S. PATENT DOCUMENTS

| | | | | |
|---|---|---|---|---|
| 3,061,503 | A | 10/1962 | Gould et al. | |
| 4,019,371 | A * | 4/1977 | Chaplin | |
| 4,090,899 | A | 5/1978 | Reich | |
| 4,702,498 | A | 10/1987 | Mueller et al. | |
| 5,264,059 | A | 11/1993 | Jacaruso et al. | |
| 5,730,472 | A | 3/1998 | Krause et al. | |
| 5,785,092 | A | 7/1998 | Friedrich et al. | |
| 5,824,179 | A | 10/1998 | Greig | |
| 6,050,613 | A * | 4/2000 | Wartluft | |
| 6,070,912 | A * | 6/2000 | Latham | |
| 6,164,702 | A | 12/2000 | Hauber et al. | |
| 7,498,509 | B2 * | 3/2009 | Brotzell | F16L 33/22 |
| 10,393,302 | B2 * | 8/2019 | Dill | |
| 10,550,972 | B2 * | 2/2020 | Goble | F16L 33/225 |
| 10,781,948 | B1 * | 9/2020 | Gregory | |
| 11,193,615 | B1 * | 12/2021 | Francis | |
| 11,333,280 | B2 * | 5/2022 | Firmian | F16L 33/222 |
| 2012/0167669 | A1 * | 7/2012 | Raghavendra | |
| 2013/0140811 | A1 | 6/2013 | Fahrer et al. | |
| 2014/0220356 | A1 | 8/2014 | Van Tooren | |
| 2014/0363220 | A1 | 12/2014 | Auer et al. | |
| 2014/0375047 | A1 | 12/2014 | Jones | |
| 2019/0128458 | A1 | 5/2019 | Kimball et al. | |
| 2024/0263724 | A1 | 8/2024 | Traidia et al. | |

FOREIGN PATENT DOCUMENTS

| | | | |
|---|---|---|---|
| GB | 2569548 | A | 6/2019 |
| WO | 88/06517 | A2 | 9/1988 |
| WO | 0055538 | A1 | 9/2000 |
| WO | 2022133272 | A1 | 6/2022 |

OTHER PUBLICATIONS

R.V. Moorleghem, Welding of thermoplastic to thermoset composites through a thermoplastic interlayer, MSc. Thesis, Delft University of Technology, 2016 (67 pages).

I.F. Villegas, et al., "Ultrasonic welding of carbon/epoxy and carbon/PEEK composites through a PEI thermoplastic coupling layer," Composites Part A, 2018 (9 pages).

T. Beiss, et al., "Vibration Joining of Fiber-Reinforced Thermosets," Polymer Composites, 2010 (8 pages).

M.P. Gierulski, et al., "Electrofusion welding and reinforced thermoplastic pipes—A review," Journal of Reinforced Plastics and Composites, 2022 (17 pages).

J. Bowman, "A Review of the Electrofusion Joining Process for Polyethylene Pipe Systems," Polymer Engineering and Science, 1997 (18 pages).

International Search Report and Written Opinion issued in Application No. PCT/US2026/015637, mailed on May 21, 2026 (16 pages).

* cited by examiner

CORROSION-FREE WELDING CONNECTION FOR REINFORCED THERMOPLASTIC PIPES (RTP)

BACKGROUND

Reinforced Thermoplastic Polymer (RTP) pipes are extensively used in the oil and gas and petrochemical industry for the transport of various fluids such as water, crude oil, gas and chemicals. FIG. 1 illustrates a typical layer structure of RTP pipe. As shown, typical RTP pipe (110) includes an inner thermoplastic liner (112), a fiber reinforcement layer (114) layered around the inner thermoplastic liner (112), and an external thermoplastic jacket (116) layered around the fiber reinforcement layer (114). Inner thermoplastic liners may be made of, for example, polyethylene, polyvinyl chloride, polypropylene, polyurethane, polyamide, and/or polyvinylidene fluoride, using an extrusion process to form a tubular, pipe shape. The fiber reinforcement layer (114) may be made of, for example, polyethylene, aromatic polyamide, polyester, polyamide, glass, carbon, and/or metal fibers, by winding or weaving lengths of the fibers around the inner thermoplastic liner. The external thermoplastic jacket (116) may be made of, for example, polyethylene, polyvinyl chloride, polypropylene, polyurethane, and/or polyamide, using an extrusion process.

Compared to other nonmetallic pipes, such as Reinforced Thermoset Resin (RTR) pipes, RTP pipe presents some flexibility that allows spooling, and thus transport of significant lengths (e.g., several hundreds of meters long seamless pipe) of RTP on a spool. Because the spooling capability of RTP pipe allows for long seamless lengths of pipe to be made, the need for connections is reduced since one connection may only be needed every few hundred meters. For example, in contrast to RTP pipes, RTR pipes are generally produced in rigid segments of about 10-12 meters in length and transported onsite before being eventually assembled (jointed) to each other to the required length.

Although the number of connections needed for RTP pipe may be reduced, connections remain the weak link of the pipeline, where the probability of leakage is much higher than anywhere else in the pipe.

There have been many attempts to develop RTP connections that exhibit both high mechanical performances, while showing good sealing properties and corrosion resistance to the transported fluids. The design of RTP connections and associated know how is often proprietary to the individual RTP suppliers with little or no standardization (unlike other types of composite pipe technologies, such as RTR).

In general, known RTP connections can be grouped into three main categories: metallic connections, fiber reinforced thermoset connections, and thermoplastic couplers. Metallic connections provide excellent mechanical and thermal resistance but are prone to corrosion damage over time when exposed to transported hydrocarbons or harsh environmental conditions. Fiber reinforced thermoset connections (such as Glass Reinforced Epoxy (GRE)) show acceptable mechanical and thermal performances but cannot be directly welded to an RTP pipe since thermoset polymer cannot be welded. Thermoplastic couplers (often unreinforced) are used to join thermoplastic pipes via thermal welding (e.g., electrofusion). However, the relatively low mechanical and thermal performances of the resulting connection leads to the operational envelop of the system being limited, and therefore pressure rating of the system is often limited by the pressure rating of the coupler itself.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to connection system comprising: a coupler disposed internally between a first pipe and a second pipe; a set of wedges positioned circumferentially around an outer surface of each of the first pipe and the second pipe; a spacer positioned circumferentially around the coupler and disposed between the set of wedges on the first pipe and the set of wedges on the second pipe; an external ferrule disposed circumferentially around each set of wedges, wherein the spacer comprises a perimetric channel comprising a plurality of connection chambers; and a venting port connecting one of the plurality of connection chambers to an outside environment and is configured to collect and canalize any leaked fluid existing in an annulus between an inner thermoplastic liner and an external thermoplastic jacket of the first pipe and the second pipe or existing in an area between the first pipe, the spacer, and the second pipe, the venting port comprising an instrumentation port for sensing leaked fluid through the venting port.

In one aspect, embodiments disclosed herein relate to a method for connecting a first pipe to a second pipe, the method comprising: positioning a coupler internally between the first pipe and the second pipe; installing a set of wedges circumferentially around an outer surface of each of the first pipe and the second pipe; installing a spacer circumferentially around the coupler and between the set of wedges on the first pipe and the set of wedges on the second pipe, wherein the spacer comprises a perimetric channel comprising a plurality of connection chambers; installing an external ferrule circumferentially around each of the set of wedges; collecting and canalizing any leaked fluid existing in an annulus between an inner thermoplastic liner and an external thermoplastic jacket or existing in an area between the first pipe, the spacer, and the second pipe, via a venting port connecting one of the plurality of connection chambers to an outside environment; and sensing leaked fluid via an instrumentation port in the venting port.

Other aspects and advantages of the claimed subject matter will be apparent from the following description and the appended claims.

DETAILED DESCRIPTION

Figure 1:
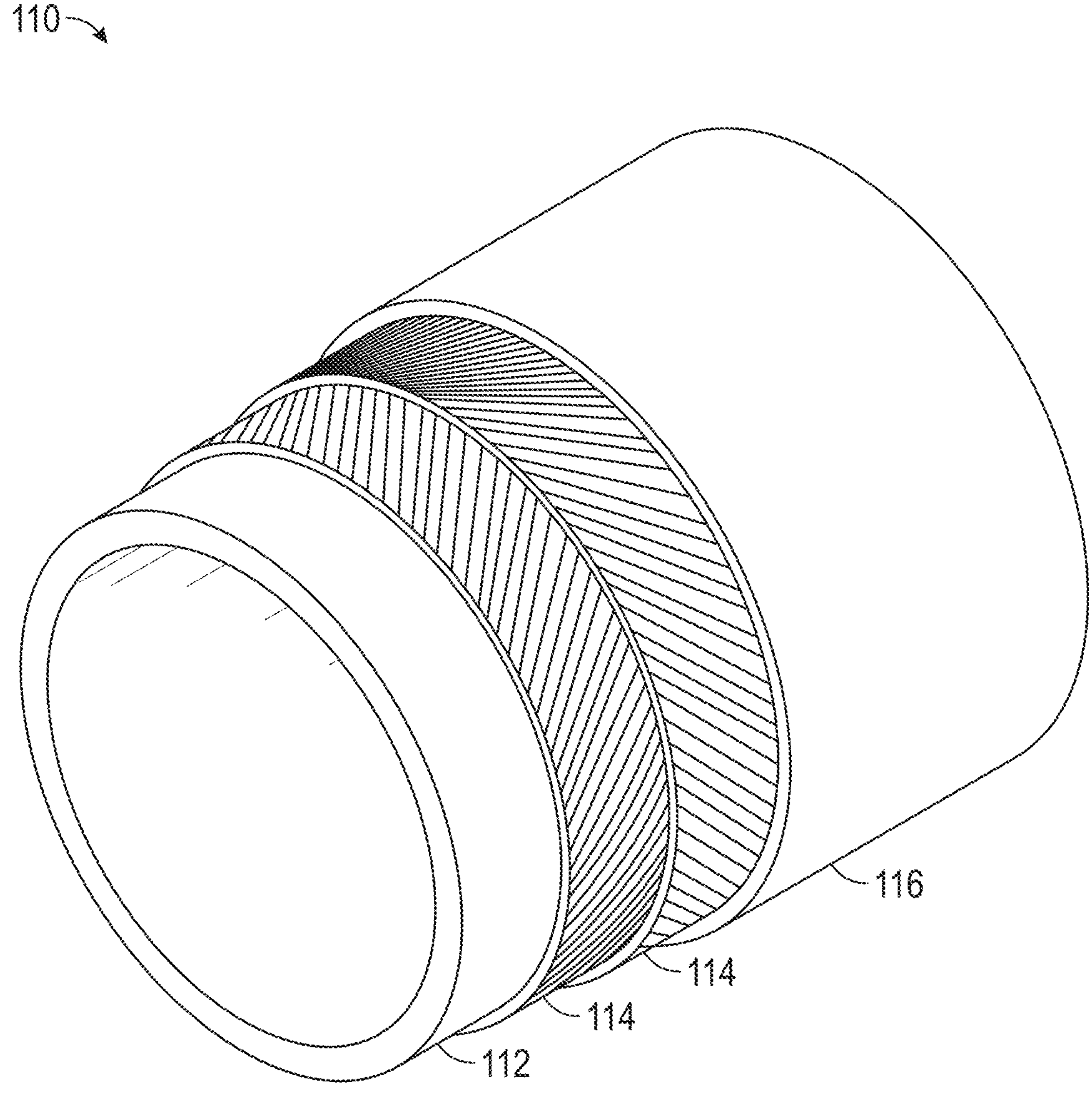
FIG. 1 shows a structure of a conventional RTP pipe in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Regarding the figures described herein, components described with regard to a figure, in various embodiments disclosed herein, may be equivalent to one or more like-named components described with regard to any other figure. For brevity, descriptions of these components may not be repeated for each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In general, embodiments of the disclosure describe a corrosion-free connection system and a method for an inner coupling cylinder and sealing of two RTP (reinforced thermoplastic polymer) pipe ends. Connectors, systems, and methods disclosed herein include coupling and sealing RTP pipes by leveraging the structural features of reinforced thermosetting materials and the weldability and sealing performance of thermoplastic materials. Connection systems and methods according to embodiments of the present disclosure may alleviate corrosion issues otherwise apparent with metallic connections, alleviate failures due to mechanical or thermal loads that may otherwise occur in thermoplastic connections, and provide optimal sealing, as observed with systems capable of thermoplastic welding. Advantages of the embodiments disclosed herein include capability of inserting sensors via instrumentation ports to sense leaking fluid and for condition monitoring.

According to embodiments of the present disclosure, a connection system for joining two RTP (reinforced thermoplastic polymer) pipe may include an RTR (reinforced thermoset resin) coupler positioned internally between the ends of the two RTP pipe. RTP pipe refers to pipe formed of concentric layers of multiple materials, generally including an inner liner and an outer jacket both made of thermoplastic material. The coupler may include a body made of fiber reinforced thermoset material, where connection ends of the RTR coupler are modified to be weldable to the RTP pipes using thermoplastic tie layers. In some embodiments, a coupler may be made entirely of an fiber reinforced thermoplastic material, which may eliminate the need to add the sacrificial tie layer for welding to the liner (assuming the two thermoplastics are weld-compatible). By providing thermoplastic connection ends of a coupler that fit against the thermoplastic material of the RTP pipe being connected, the thermoplastic connection ends may be melted with the interfacing thermoplastic material of the RTP pipe to "weld" the connection ends of the coupler to the ends of the RTP pipe, thereby connecting the RTP pipe together.

According to embodiments disclosed herein, in addition to using thermoplastic welding to connect RTP pipe to a coupler, connection systems disclosed herein may also include mechanical connection components. For example, connection systems disclosed herein may include a mechanical connection system of wedges and external ferrules that are secured around the welded connection ends between the coupler and RTP pipe. In addition, the connection systems disclosed herein include a central spacer with venting capabilities coupled circumferentially around the coupler to be secured between the wedges and RTP pipes. The venting capabilities provide ports for electrofusion welding or instrumentation to monitor pipe joints or other functionalities, such as chromatography-based sensors, strain-based sensors, or pressure sensors.

Figure 2A:
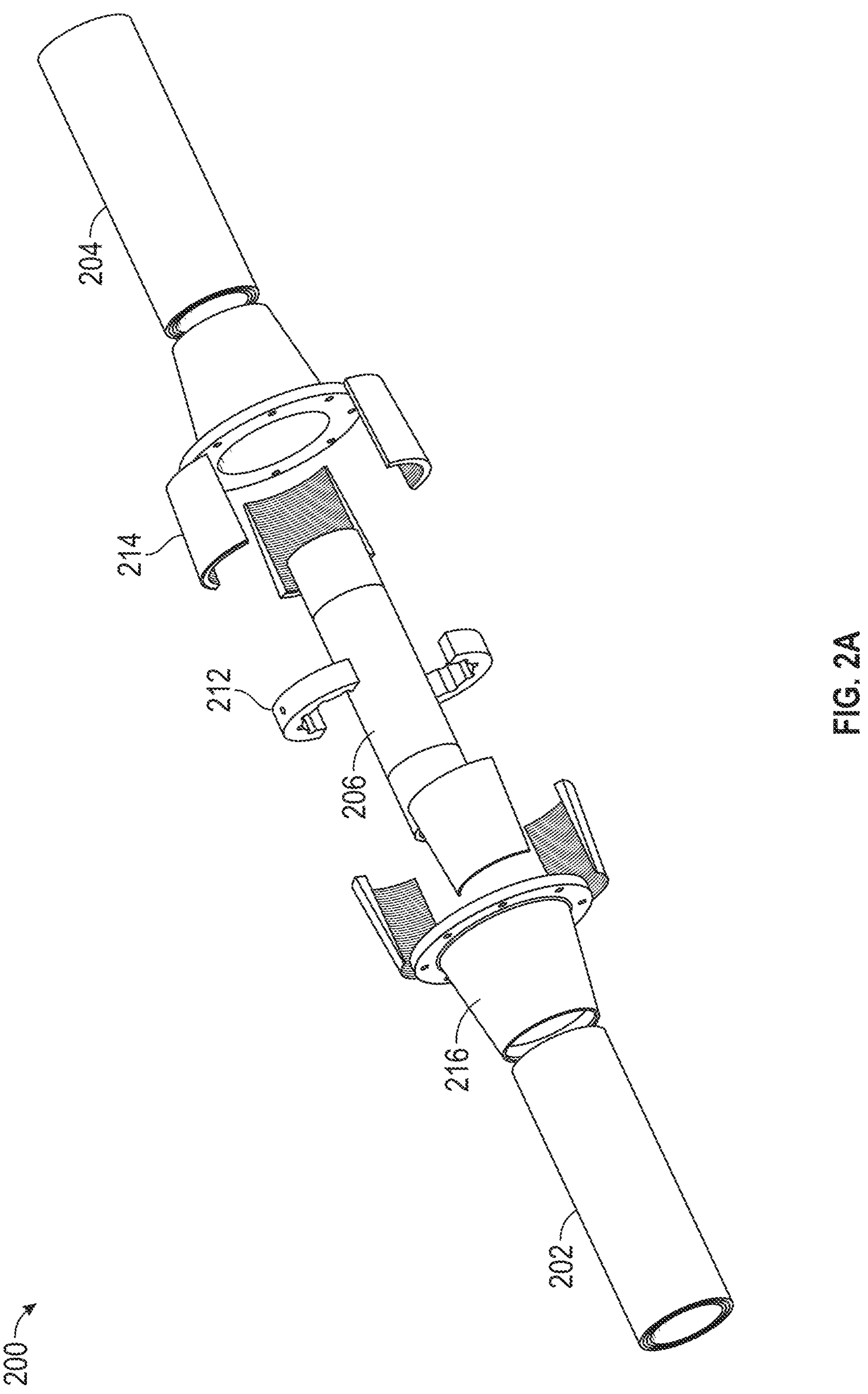
FIG. 2A shows an exploded view of a connection system in accordance with one or more embodiments.
Figure 2B:
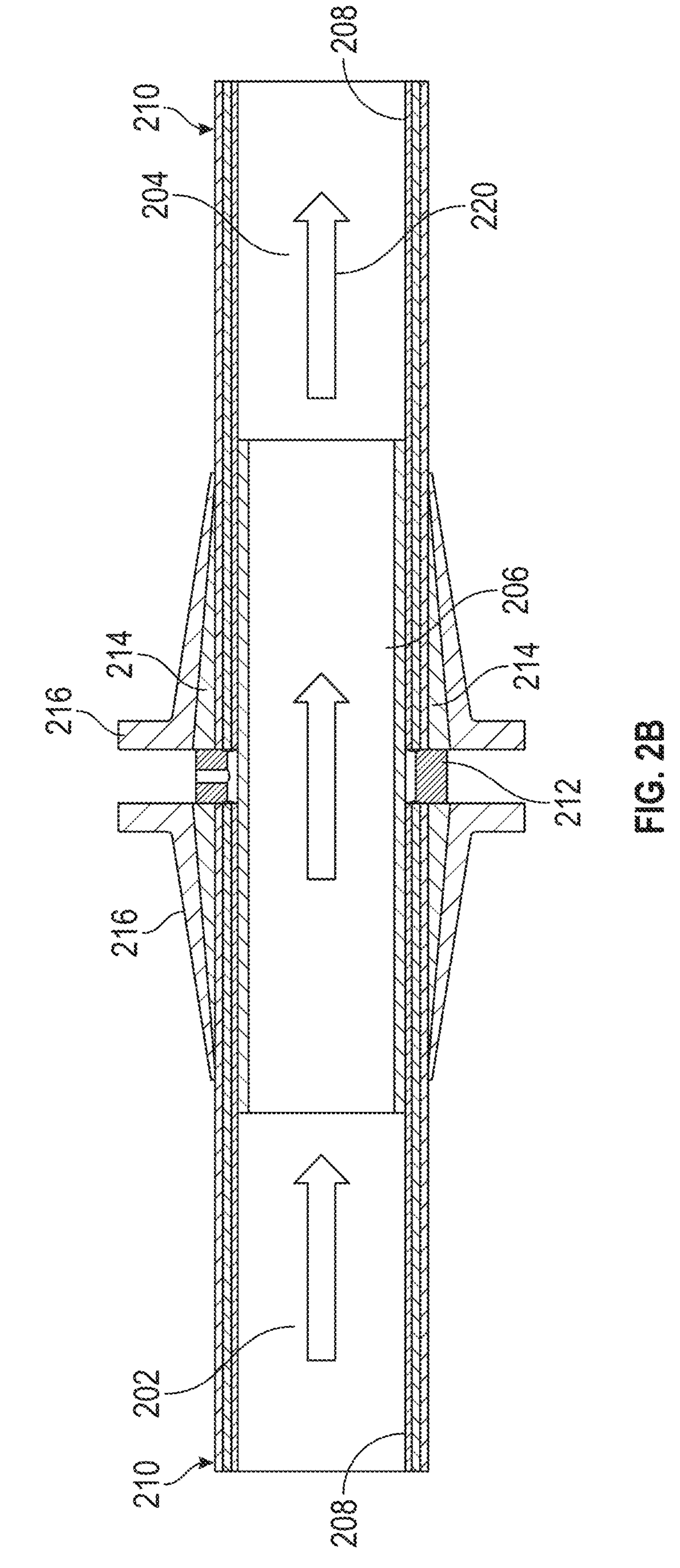
FIG. 2B shows a cross-sectional view of the connection section in FIG. 2A in an assembled configuration.
Figure 2C:
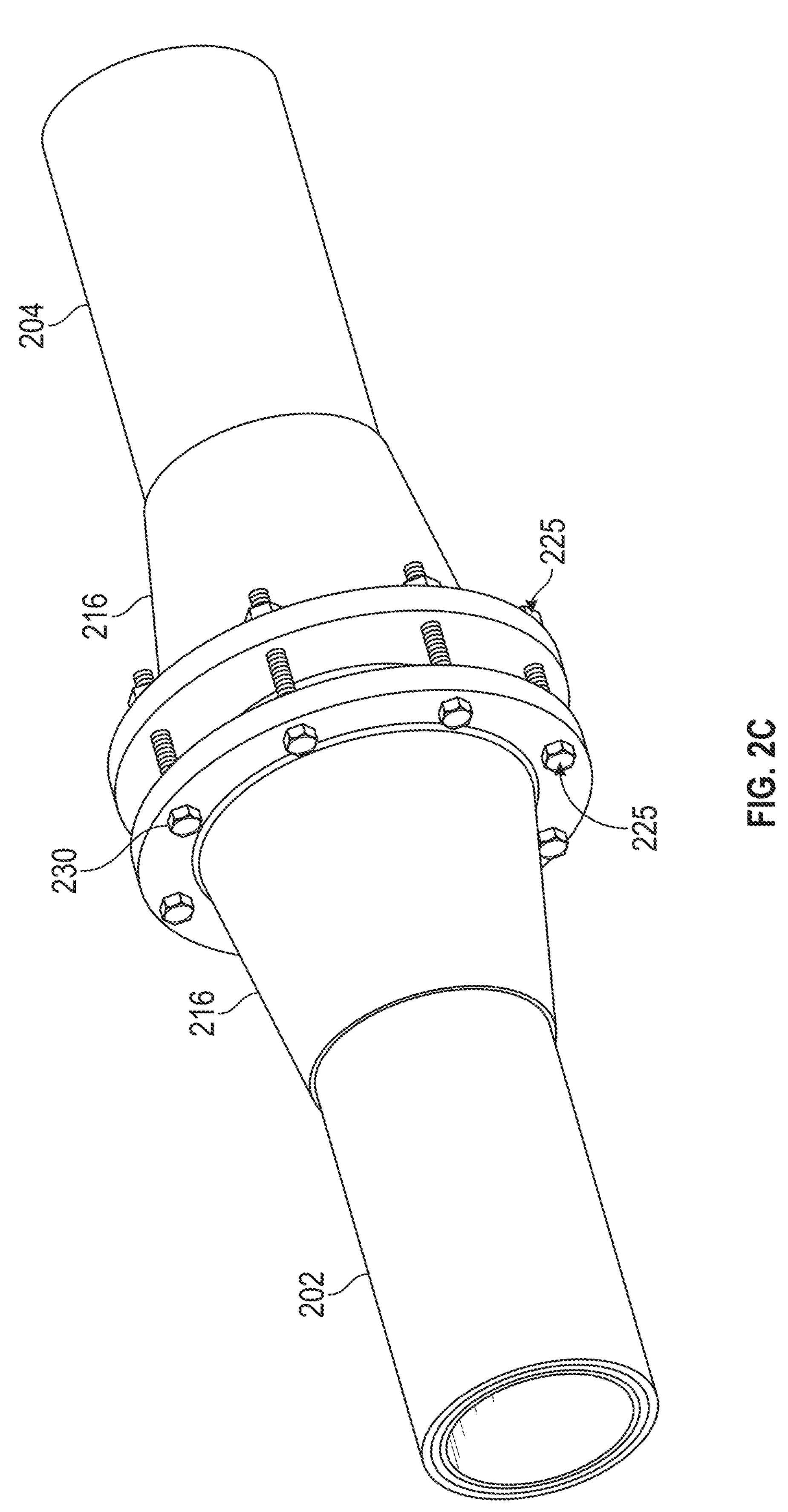
FIG. 2C shows a perspective view of the connection system in FIGS. 2A-2B in in an assembled configuration.

FIGS. 2A-2C show an example of a connection system according to embodiments of the present disclosure utilizing both thermoplastic welding and a mechanical connection system to secure the ends of a pipe to a coupler. Particularly, FIG. 2A shows an exploded perspective view of the connection system (200) prior to connection and assembly, FIG. 2B shows a cross-sectional view of the connection system (200) after connection, and FIG. 2C shows a perspective view of the connection system (200) after connection.

As shown, the connection system (200) includes a first RTP pipe (202) having a first end, a second RTP pipe (204) having a second end, and a coupler cylinder (206), herein also referred to as "coupler." Although RTP pipes are shown, a person of ordinary skill in the art would appreciate that the connection system (200) may be implemented into other pipes known in the industry, such as thermoplastic composite pipe (TCP). The first and second ends of the RTP pipe (202,204) are open. The coupler (206) is sized to fit internally between the first and second ends of the RTP pipe (202,204). In FIGS. 2A-2C, for simplicity of the drawing, the multiple layers of the RTP pipe are not shown. However, the first and second RTP pipe (202,204) include multiple layers of materials concentrically layered around each other, where the inner surface (208) and the outer surface (210) of the RTP pipe are both formed by layers (an inner liner layer and an outer jacket layer, respectively) of thermoplastic material. Thermoplastic material forming the inner and/or outer surfaces (208,210) of the RTP pipe may be selected from at least one of polyethylene (PE), polyvinylidene fluoride (PVDF), polyphenylene sulfide (PPS), polyaryletherketone (PAEK), polyamide (PA), polyether ether ketone (PEEK), acrylonitrile butadiene styrene (ABS), polypropylene (PP), or other thermoplastic polymers known in the art.

As shown in FIGS. 2A-2C, a spacer (212) is positioned circumferentially around the coupler (206). The spacer (212) may be positioned centrally on the coupler (206). A set of wedges (214) and external ferrules (216) are to be secured and tightened around the ends of the RTP pipes (202,204) to mechanically connect the ends of the RTP pipes (202,204) to the coupler (206) contacting the spacer (212). The wedges (214) may be compression wedges. The wedges (214) may be peripherical wedges. The wedges (214) are positioned circumferentially around the outer surface (210) of the first and second RTP pipes (202,204) with the spacer (212) between the RTP pipe (202,204) and wedges (214). The wedges (214) may be equally spaced around the outer circumference of the pipe ends. Additionally, the wedges (214) may be sized and provided in different amounts according to the size of the pipes being connected. For example, two or three or more wedges may be provided around the pipe ends.

The size of the wedges (214) may be selected, for example, based on the size of the pipes (202,204) being connected and/or desired pressure rating of the connection. For example, the wedge length (as measured in the direction parallel with the central axis of the pipe being connected) may be designed based on the pipe diameter and pressure rating, where relatively larger diameter pipes with relatively higher pressure ratings will use relatively longer wedges to transfer higher loads.

After wedges (214) have been assembled around a coupler/spacer/pipe connection with the spacer (212) between the wedges (214) and pipes (202,204), the external ferrules (216) and flanges are fitted around the assembled wedges (214). For example, as shown in FIG. 2B, after the wedges (214) are assembled around the coupler/spacer/pipe connections, an external ferrule (216) is fitted around a first set of wedges such that the first set of wedges is wedged between the first end of the first pipe (202) and the first external ferrule, and a second external ferrule is fitted around the second set of wedges such that the second set of wedges is wedged between the second end of the second RTP pipe (204) and the second external ferrule.

The external ferrules (216) are designed to squeeze and tie the wedges (214) to ensure the ends of the RTP pipes (202,204) are firmly and permanently connected. For example, in the embodiment shown, each external ferrule (216) has a sloped inner surface that corresponds with and interfaces with a sloped outer surface of the wedges (214). The sloped surfaces are configured to have the thicker end of the wedges positioned proximate to the spacer (212) of the coupler (206) and the thinner end of the wedges positioned distal from the spacer (212). As the external ferrules (216) are tightened together (in a direction toward the spacer (212) portion of the coupler (206)), the sloped inner surfaces of the external ferrules (216) exert a force on the wedges (214) in an axial direction towards the spacer (212) portion of the coupler (206) and in a radial direction inward towards the coupler (206). In such manner, the external ferrules (216) squeeze the wedges (214), which compresses the ends of the RTP pipe (202,204) between the wedges (214) and the coupler (206).

As shown in FIG. 2B, when the connection system (200) is assembled together, the coupler (206) is positioned internally between the first end of the first pipe (202) and the second end of the second pipe (204). There may be a fluid flow path (220) internally formed between the first and second RTP pipe (202, 204) inside the coupler (206). Although fluid flow path (220) is shown by arrows in one direction, the fluid flow path (220) may be in either direction. The coupler (206) may be formed of an fiber reinforced thermoset material, which may include, for example, a reinforcement fiber (e.g., glass, carbon fibers, or other reinforcement fibers known in the art) in a resin matrix of a thermoset polymer (e.g., polyesters, vinyl-esters, epoxies, or other thermoset polymer known in the art). The spacer (212) may be metallic or non-metallic, as the spacer is not in contact with internal fluids in the fluid flow path (220). The fluids (220) transported may be potentially corrosive fluid. Although FIG. 2B does not show connection between the external ferrules (216), FIG. 2C shows the external ferrules (216) including flanges (225) that may be connected using a connector (230), such as bolts.

As shown in FIG. 2C, one external ferrule (216) may be connected to the other external ferrule (216) using at least one connector to hold and tighten the external ferrules (216) together around the wedges (214) and spacer (212). For example, in the embodiment shown, a plurality of correspondingly positioned holes are formed through the external ferrules (216) or flanges, such that when the external ferrules (216) are positioned around the RTP pipe (202,204) and aligned with the spacer (212), circumferentially spaced through-holes are formed through the external ferrule assembly. A connector (230) (e.g., a bolt and nut assembly) may then be inserted through the through-holes to tighten both external ferrules (216) against opposite sides of the spacer (212) of the coupler (206). Thus, as shown in FIG. 2C, a connection system may include a coupler (206) having the spacer (212) and a portion of the coupler (206) sandwiched between the external ferrules (216), wherein the external ferrules (216) are connected together via the connector(s) (230). The flanges or external ferrules (216) in conjunction with the wedges (214) apply compression on the coupler/spacer/pipe connection by torquing the bolts on the connector (230), while axially approaching both external ferrules (216). While the torque is applied, the spacer (212) locks the wedges (214) in an axial direction in place for firm connection.

According to embodiments of the present disclosure, flanges or external ferrules may have various sizes and shapes capable of tightening around a set of wedges. Additionally, external ferrules may have a coupler connection side with different shapes or sizes. The wedges and external ferrules may be made of a non-metallic material (e.g., with piping having lower pressure requirements). For example, wedges and/or external ferrules may be made of fiber reinforced thermoset material such as glass-reinforced epoxy or carbon-reinforced epoxy, or fiber reinforced thermoplastic material such as short or continuous fiber reinforced thermoplastic material, carbon-reinforced PEEK, or carbon-reinforced PPS. By using non-metallic material to form the wedges and external ferrules, the connection system (200) may be fully non-metallic, which would provide immunity to external corrosion. Moreover, a fully nonmetallic connection may be significantly lighter than its metallic equivalent, which may provide logistic advantages (e.g., for transportation, handling, etc.). In other embodiments, the wedges and/or external ferrules may be metallic.

Figure 3A:
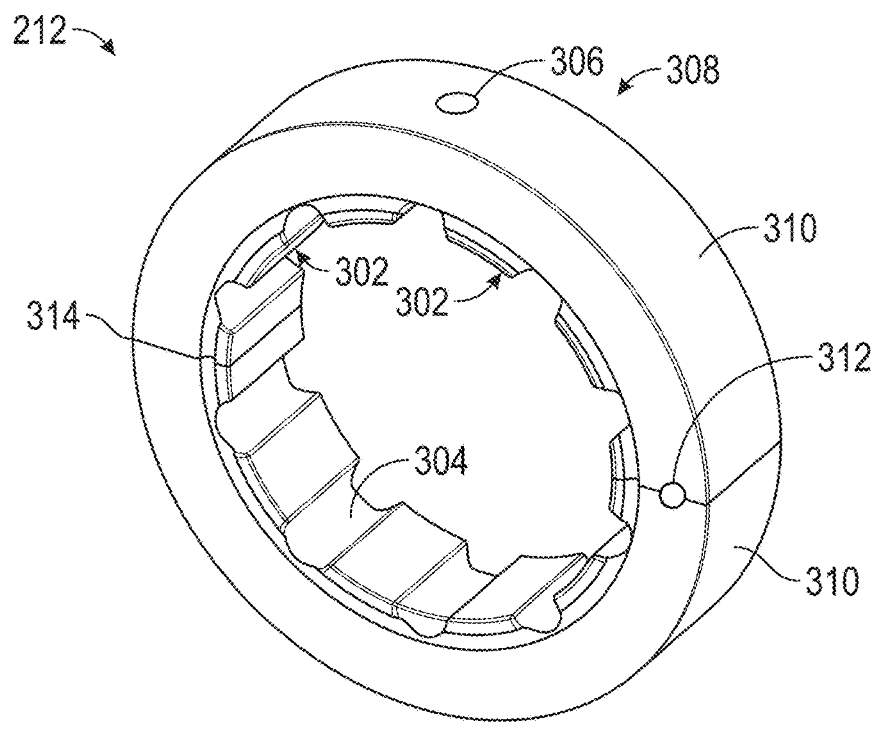
FIG. 3A shows a perspective view of a spacer in accordance with one or more embodiments.
Figure 3B:
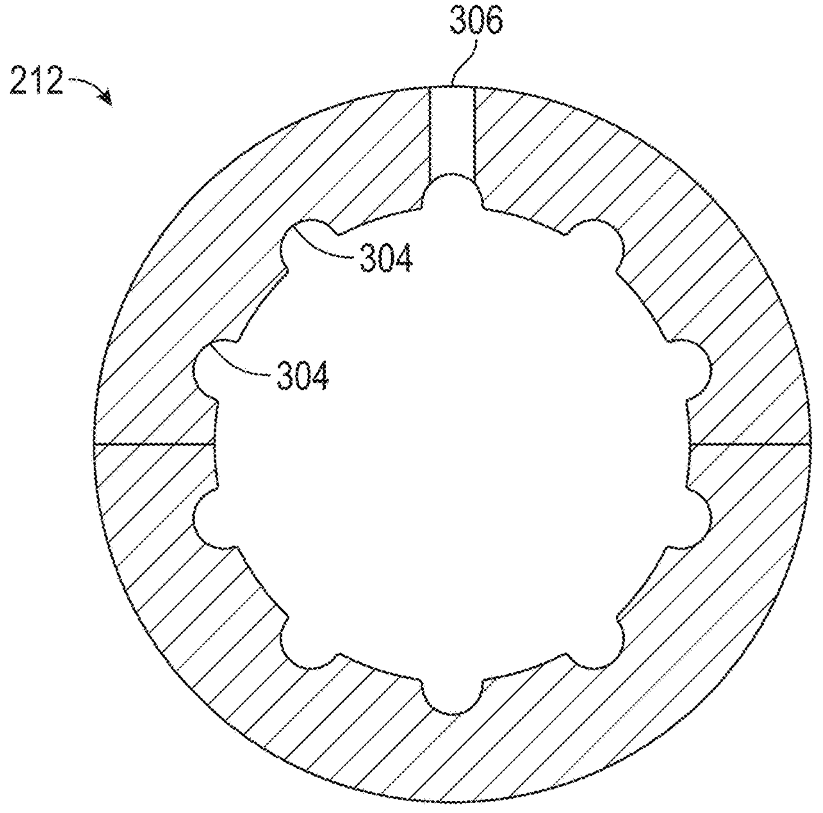
FIG. 3B shows a cross-sectional view of the spacer in FIG. 3A in accordance with one or more embodiments.

FIGS. 3A and 3B show the spacer (212) used in conjunction with FIGS. 2A-2C. Specifically, FIG. 3A shows a perspective view of the spacer (212) and FIG. 3B shows a cross-sectional view of the spacer (212). The spacer (212) includes a perimetric channel (302) with connection chambers (304). For example, the perimetric channel (302) may include any number of connection chambers (304), such as eight connection chambers or the ten connection chambers shown in FIGS. 3A-3B. The perimetric channel (302) may be a venting channel for confronting an annulus (700) or area (702) when required, such as for the RTP pipe further discussed in FIG. 7.

As shown in FIGS. 3A and 3B, the spacer (212) may utilize one or more venting ports (306) formed therethrough. The venting port (306) connects one of the connection chambers (304) to an outside environment (308), wherein the venting port (306) fluidly connects an interface between the inner thermoplastic liner (112) and the external thermoplastic jacket (116) of the RTP pipe (202,204) to the outside environment (308). The venting port (306) is designed to collect and canalize any leaked fluid or gas. The venting port (306) is also an instrumentation port used for sensing leaked fluid through the venting port (306). The venting port (306) may be a multipurpose port for instrumentation, electrofusion welding, or other functionalities. One venting port (306) may be added to any or each connection chamber (304). The exterior of the venting ports (306) or the outside environment (308) may be fluidly connected to a gas collection system, a storage container, or other component located exterior to the RTP pipe (202,204). In such manner, fluid (e.g., fluid (220)) trapped, such as gas, between the RTP pipe (202,204) and the coupler (206) may flow through the venting port (306) to another fluidly connected system, e.g., to be stored, reused, and/or redirected back into the pipes.

In RTP pipes, a small fraction of transported gases can sometimes permeate through the inner liner of the pipe and then travel axially along the pipe annulus (e.g., in unbonded pipes) to end up at the pipe to pipe connector. Accordingly, venting ports (306) may be added to the connection system, such as shown in FIGS. 3A and 3B, in order to collect the permeated gases (e.g., for collection or re-injection).

Figure 4:
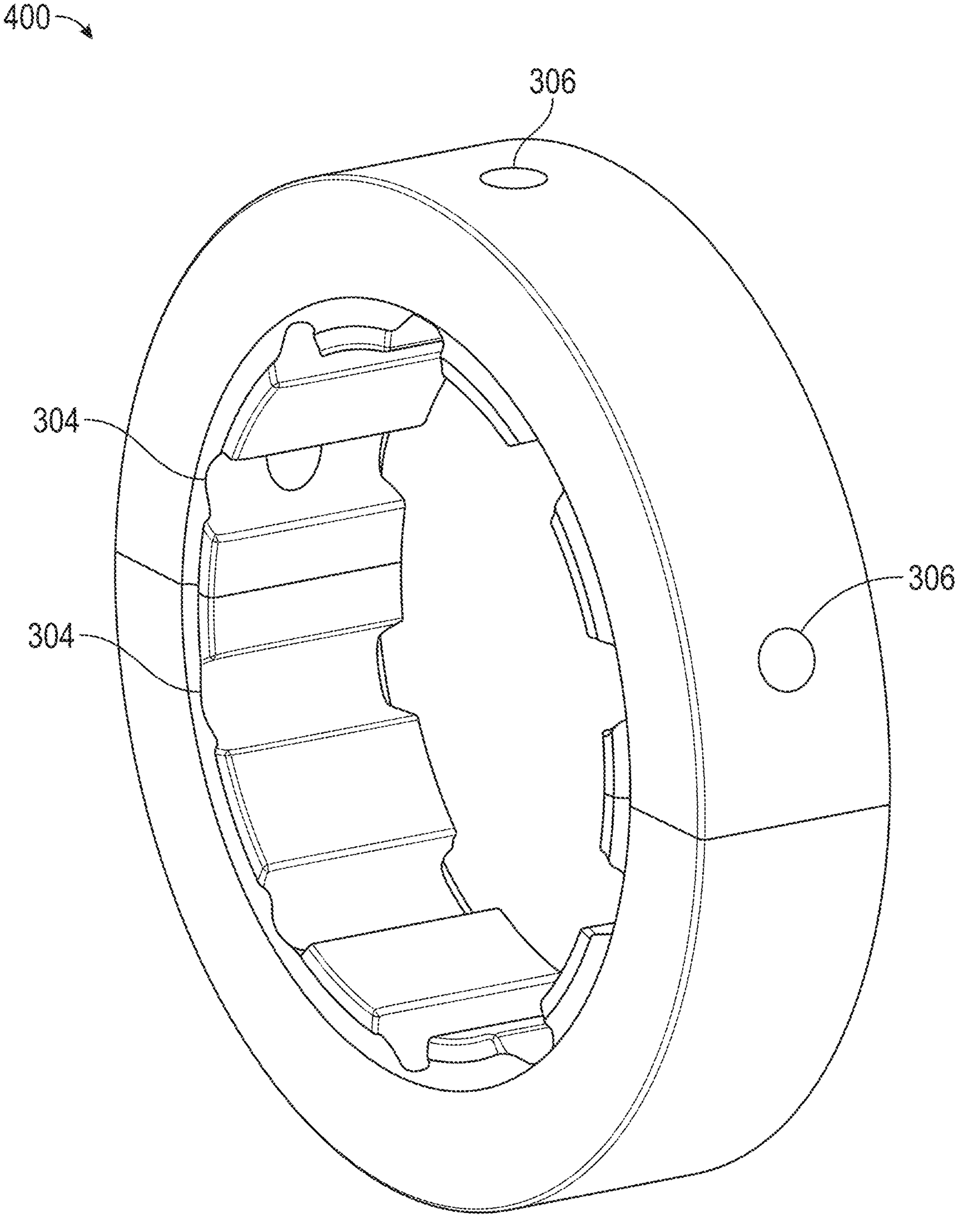
FIG. 4 shows a perspective view of an example spacer in accordance with one or more embodiments.
Figure 5:
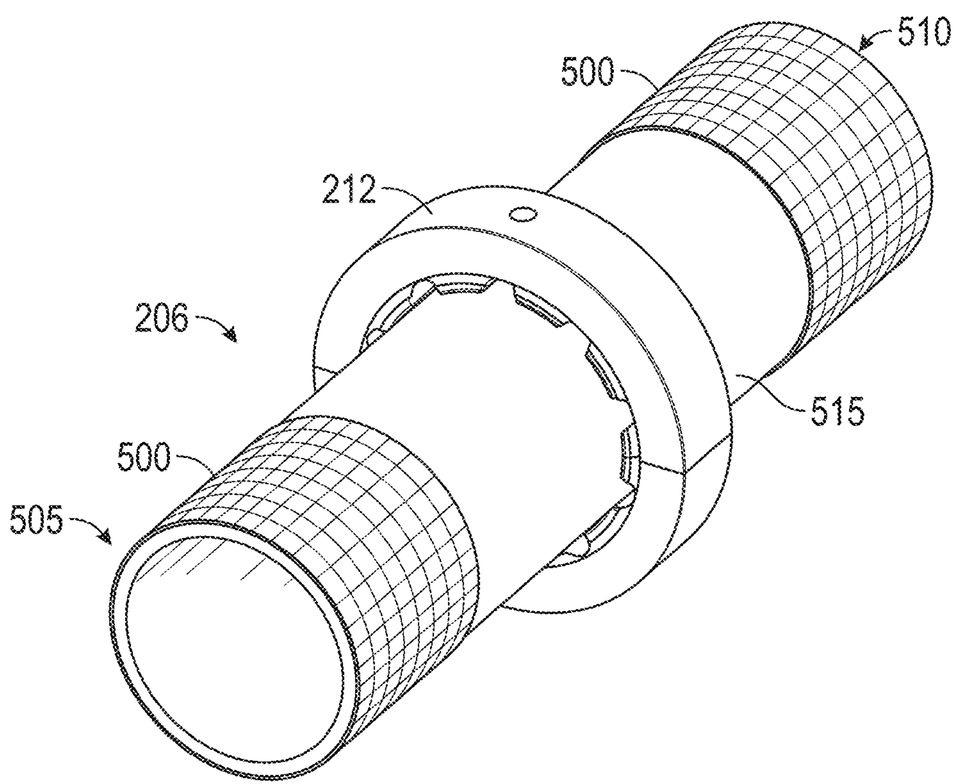
FIG. 5 shows an example coupler with the spacer used in conjunction with FIGS. 2A-2C.

FIG. 4 shows an example spacer in accordance with one or more embodiments. Specifically, FIG. 4 shows a configuration for a multi-vent port spacer (400) with two venting ports (306). In one or more embodiments, the multi-vent port spacer (400) may include more venting ports (306). For example, any or all of the connection chambers (304) may have a venting port (306). A connection chamber (304) and venting port (306) may be added as necessary up to covering any available space on the spacer (212). The spacer (212) may be a single ring as shown in FIG. 4 or two or more segments (310) connectable as a ring via a bolt (312) or bond (314) as illustrated in FIGS. 2A and 3A. In practice, the coupler (206) and spacer (212) may be shipped to an installation site ready to be deployed as one assembly, as shown in FIG. 5, or in two separate parts. Furthermore, the spacer (212) may be metallic or non-metallic depending on joint or pipe requirements. Examples of nonmetallic materials for the spacer (212) include but is not limited to elastomers, thermoplastic elastomers, thermoplastic polymers, RTP, thermoset polymers, or reinforced thermoset materials. Manufacturing techniques for such non-metallic spacers may be any variant of resin transfer molding, sheet molding compounding, injection molding, casing, prepregs lamination, pultrusion or filament winding, etc.

According to embodiments of the present disclosure, a coupler can be adapted to any pipe dimension and fully independent on pipe design. As such, couplers according to embodiments of the present disclosure may be particularly suitable for retrofit to existing RTP installations.

FIG. 5 shows an example of the coupler (206) including the spacer (212) in accordance with one or more embodiments. As described in previous embodiments, the coupler (206) may be formed of an fiber reinforced thermoset material. The fiber reinforced thermoset material may be selected from, for example, Glass Reinforced Polyester (GRP), Glass Reinforced Vinylester (GRV), carbon fiber, Glass Reinforced Epoxy (GRE), and/or other reinforcements used in the industry. According to embodiments of the present disclosure, the RTR coupler body (515) may be manufactured in one bloc (e.g., using a filament winding process, pultrusion, or resin transfer molding). The coupler (206) may be functionalized to have thermoplastic connection surfaces covering the fiber reinforced thermoset material by joining a layer of thermoplastic material to the first and second end of the RTP pipe (202,204), where the thermoplastic connection surfaces on the coupler (206) are designed to interface with thermoplastic connection surfaces on the RTP pipe (202,204). In such manner, thermoplastic tie layers (500) can be provided between the coupler (206) and the ends of the RTP pipe (202,204). For example, as shown in FIG. 5, a thermoplastic tie layer (500) may be bonded around the outer surfaces of a first and second end (505,510) of the coupler (206) to provide thermoplastic connection surfaces on the coupler (206). When thermoplastic connection surfaces are provided around the exterior of the coupler (206), the functionalized coupler (206) may be inserted into the ends of the RTP pipes such that the exterior thermoplastic connection surfaces of the coupler (206) interface with the inner thermoplastic surfaces of the RTP pipe (202,204). The thermoplastic tie layer (500) is weldable to an inner thermoplastic liner (shown in FIG. 1) of the first and second RTP pipe (202,204). In one or more embodiments, the coupler (206) includes the thermoplastic tie layer (500) as a full surface cover.

Further described below, the first and second end (505, 510) of the coupler (206) may be tapered ends that have undergone surface preparation in the factory, such as grit blasting or sanding. The surface preparation provides sufficient roughness and contact forging force to promote heat generation during rotary friction processes and deposition of thermoplastic tie layers (500).

The thermoplastic material forming the thermoplastic tie layers (500) can either be the same as or different than the thermoplastic material forming the inner liner and/or the outer jacket of RTP pipe being joined by the coupler (206). However, according to embodiments of the present disclosure, the thermoplastic material forming the tie layers (500) may be selected to be weldable (e.g., have very close melting/solidification temperatures and be melt compatible, i.e., mix well when molten) to the adjoining thermoplastic layer of the RTP pipe. In addition, such thermoplastic materials must be carefully selected to ensure their function throughout the lifetime of the pipe (typically, 25 years). For example, the materials may be selected from those qualified using relevant standards to meet the service specifications in terms of design temperature, pressure, and chemical compatibility with the environment (acidic gases, liquids, aromatics contents, etc.).

In general, the selection of the most appropriate thermoplastic material for a tie layer may be driven by: welding compatibility with the RTP pipe material on one side and affinity for mechanical adherence to fiber reinforced thermoset material of the coupler on the other side; chemical compatibility and resistance to the transported fluids; melting temperature shall not exceed the maximum temperature that causes significant degradation of the thermoset material during the friction deposition process or the secondary welding process (induction in the field); and sufficient mechanical and permeation barrier properties.

Examples of thermoplastics that can be used for a tie layer, include but are not limited to polyolefins (e.g., polypropylenes or polyethylenes), polyvinylidene fluoride (PVDF), polytetrafluoroethylene (PTFE), polyphenylene sulfide (PPS), polyaryletherketones (PAEK), polyethylenimine (PEI), high-density polyethylene (HDPE), polyethylene of raised temperature (PE-RT), aliphatic polyketone (PK), polyetheretherketone (PEEK) (and other polyaryletherketones), polyetherketoneketone (PEKK), polyamide 12 (PA12), polyketone (POK), and their carbon beads or short fiber reinforced grades, and other thermoplastic resins.

A thermoplastic layer (which may include susceptors, if needed) may be bonded on connection (faying) surfaces of an RTR coupler (e.g., around the outer surfaces of the ends of the coupler) at the RTR coupler manufacturing stage, or after the manufacture and distribution of an RTR coupler body to an installation site. Various methods can be used to apply and bond the tie layers to a thermoset RTR coupler body. For example, a thermoplastic powder may be thermally sprayed on a faying surface of the thermoset RTR coupler body (with sufficient surface preparation, e.g., sand blasting) or a thermoplastic implant may be applied while the thermoset RTR coupler body is in a partially cured (or uncured) state, followed by co-curing at the required temperature (below the melting temperature of the thermoplastic) to bond a thermoplastic tie layer to the RTR coupler body. In one or more embodiments, the deposition of tie layers may be conducted in the factory at the manufacturing stage. Because the surface preparation of a substrate often conditions the final quality of a coating, a clean and controlled environment (e.g., dust free, temperature regulation, etc.) is advantageous, which is easier to achieve in the manufacturing site.

In some embodiments, a thermoplastic tie layer may be friction welded (e.g., using a friction welding tool) around a faying surface (e.g., an outer surface of the ends of the coupler) of an RTR coupler body, where the RTR coupler body is a single, integrally formed body of fiber reinforced thermoset material. For example, a thermoplastic tie layer may be friction welded to faying surfaces of an RTR coupler body using a rotary friction welding process, where one component (e.g., a sleeve forming the thermoplastic tie layer) may be rotated against the other component being joined (e.g., the RTR coupler) to cause enough friction work to heat and thermally weld the components together.

Prior to friction welding, friction weld faying surfaces may undergo surface preparation in the factory (e.g., via grit blasting/sanding) to provide sufficient roughness and contact forging force to promote heat generation during the rotary friction process and deposition of the thermoplastic tie layers onto the reinforced thermoset coupler ends. Surface preparation is important in friction welding components, as it not only contributes to both the means of adherence between the faying materials, but also, the frictional properties of the faying surfaces and, therefore, the rate at which frictional heat is generated in the joining process.

Figure 6:
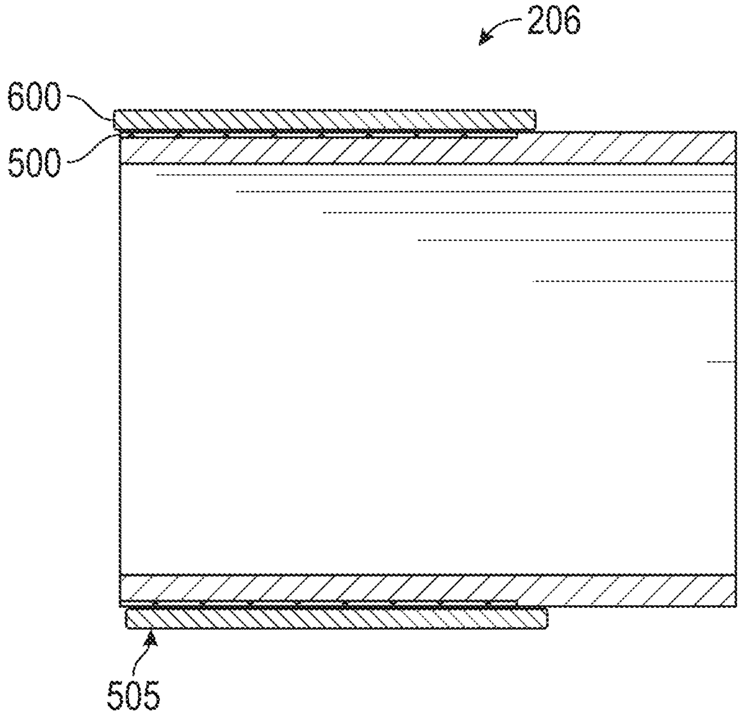
FIG. 6 shows a partial cross-sectional view of the coupler in FIG. 5.

FIG. 6 shows one of the ends (505,510) of the coupler (206) of FIG. 5 in a partial cross-sectional view. FIG. 6 may illustrate either the first end (505) or the second end (510) of the coupler (206). Specifically, FIG. 6 shows the coupler (206) including the thermoplastic tie layer (500) as an embedded conductive arrangement. The thermoplastic tie layer (500) may be a susceptor for induction welding and metallic wire for electrofusion. In some embodiments, a top layer of susceptor material (600) may be deposited around a base layer of thermoplastic material after the thermoplastic material has been friction welded to the RTR coupler body. For example, a base layer of thermoplastic material may be friction welded onto the RTR coupler (206) and machined to a desired bond line thickness. Upon solidification of the base layer, a top layer of susceptor material (600) (e.g, carbon fibers or copper wires) may be deposited on top of the base thermoplastic layers. As discussed further below, the susceptor material (600) may be used for a second welding process (taking place in the field during installation). Using an appropriate welding process (e.g., electrofusion or induction), the circulation of an electric current inside the susceptor material (600) will generate sufficient heat via Joule effect to melt and fuse the thermoplastic tie layers (500) to RTP pipe.

The susceptor material may be selected from at least one of: silicon carbide, molybdenum, graphite, stainless steel, aluminum, and other conductive materials. The type and location of the susceptor material may be selected to prevent a preferential leak path and reduce the permeation resistance of the connection, whether this be via adjacent continuous carbon fibers, between locally contacting short fibers, or electrically conducting particles. In other words, the type and location of the susceptor material in thermoplastic tie layers may be selected such that the electrical percolation network is not also a permeation network.

Figure 8:
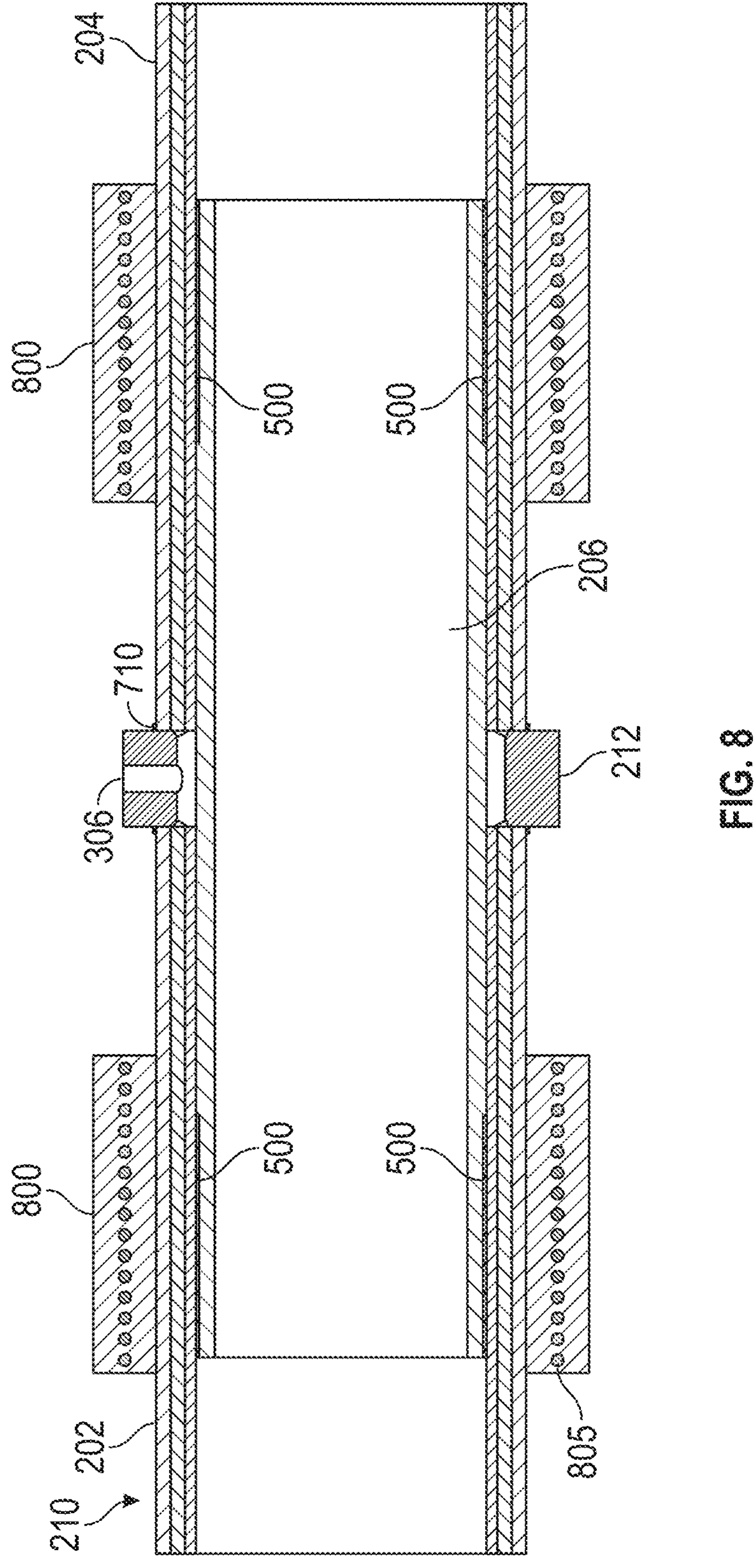
FIG. 8 shows an example of a heating step to form a thermoplastic weld according to methods of the present disclosure.

As further described in FIG. 8, the interfacing thermoplastic connection surfaces may be melted to thermoplastic weld the first and second end (505,510) of the coupler (206) to the ends of the RTP pipe (202,204). Methods of providing thermoplastic connection surfaces on fiber reinforced thermoset material of the coupler (206) is described below.

According to embodiments of the present disclosure, a thermoplastic tie layer (e.g., thermoplastic tie layer (500)) may be made of the same thermoplastic material as the inner liner of the RTP pipes being connected or a different thermoplastic material that is thermoplastic weldable to the RTP pipes being connected.

By integrating thermoplastic connection surfaces on an RTR coupler made of fiber reinforced thermoset material, a coupler having relatively higher strength, chemical resistance, and temperature resistance (provided from the fiber reinforced thermoset material) with an integrated weldable interface to permanently connect and seal to RTP pipe. Thus, according to embodiments of the present disclosure, couplers having a body made of fiber reinforced thermoset material and thermoplastic connection surfaces may be designed to have sufficient strength in the axial direction to transfer increased loads from one pipe to the other. Additional examples of and a more detailed discussion of couplers according to embodiments of the present disclosure and methods of making such couplers is provided below following the discussion of the connection system overview.

In other embodiments, a coupler may be formed entirely of fiber reinforced thermoplastic material, which may eliminate the need to add the sacrificial tie layer for welding to RTP pipe when the coupler and pipe thermoplastics are weld compatible.

In some embodiments, the coupler (206) length and position of the tie layers (500) may modify the welding technology used. The welding technology may include induction, electrofusion, or any other appropriate technology. Electrofusion may be advantageous with the venting ports (306) by extracting terminals to energize electrofusion conductors embedded in the tie layers (500) and perform welding after partially torquing the bolts to ensure mutual contact between surfaces being welded.

Looking back at FIGS. 2A-2C, in embodiments of the disclosure where the coupler (206) has been thermoplastic welded to the RTP pipe (202,204) as described in FIGS. 5 and 6, the set of wedges (214) may then be arranged around the coupler/spacer/pipe connection. For example, after the first and second end (505,510) of the coupler (206) are thermoplastic welded to the RTP pipes (202,204), wedges (214) are positioned circumferentially around an outer surface (210) of the first end of the first pipe (202) and of the second end of the second pipe (204). The rest of the assembly and connection system (200) is the same as described previously in FIGS. 2A-2C. Connection systems such as shown in FIGS. 2A-2C may have sufficient strength in the axial direction to transfer loads from one pipe to the other. Part of an axial load through the connected pipes (202,204) may be transferred through the thermoplastic welded surface between the coupler (206) and the RTP pipe (202,204), while a majority of the axial load may be transferred through the wedges (214) in the mechanical connection system.

The embodiments shown in FIGS. 2A-6 show connection systems that generally include (1) an internal coupler made of a reinforced thermoset resin with modified surface ends to allow "weldability" to thermoplastic layers of to-be-jointed RTP pipes, (2) a series of wedges assembled around the circumference of the RTP pipe outer surface, (3) optional sealing components to prevent ingress of external fluid into the RTP structure, (4) external ferrules to allow full assembly of the system using bolts, and (5) a spacer centrally positioned on the internal coupler wedged between the wedges and RTP pipe for venting and instrumentation capabilities.

Thus, in the embodiments shown in FIGS. 2A-6, the connection systems use a mechanical connection system that includes a series of external ferrules/flanges and wedges, and optional sealing components, to enable a tight mechanical interlock between the coupler and spacer and the RTP pipe. However, other mechanical connection systems may be envisioned without departing from the scope of this disclosure. For example, different types of flange connectors may be used to tighten flanges around wedges or different types of mechanical tightening components may be used such as components that are radially adjustable/tightened (e.g., as used with hose clamps). By integrating a mechanical connection system with the thermoplastic welded connection system, the connection system may have both improved strength and sealing performance.

According to embodiments of the present disclosure, a coupler made with fiber reinforced thermoset material having a spacer may be used to connect the axial end(s) of RTP pipe. For example, connection methods according to embodiments of the present disclosure may generally include providing a coupler with a cylindrical body having a spacer with a thermoplastic tie layer provided around the ends of the coupler's outer surface. The coupler may then be fitted internally into each end of the RTP pipe, wherein the RTP pipe has an inner surface made of a thermoplastic material. Heat may then be applied to the fitted pipe end(s) to thermoplastic weld the inner surface of the RTP pipe ends to the thermoplastic tie layer of the coupler.

In one or more embodiments, after thermoplastic welding the coupler to the RTP pipe, a mechanical connection system may be secured around the thermoplastic weld to mechanically secure the RTP pipe to the coupler.

Examples of methods according to embodiments of the present disclosure are discussed below with reference to FIGS. 7-9.

Figure 7:
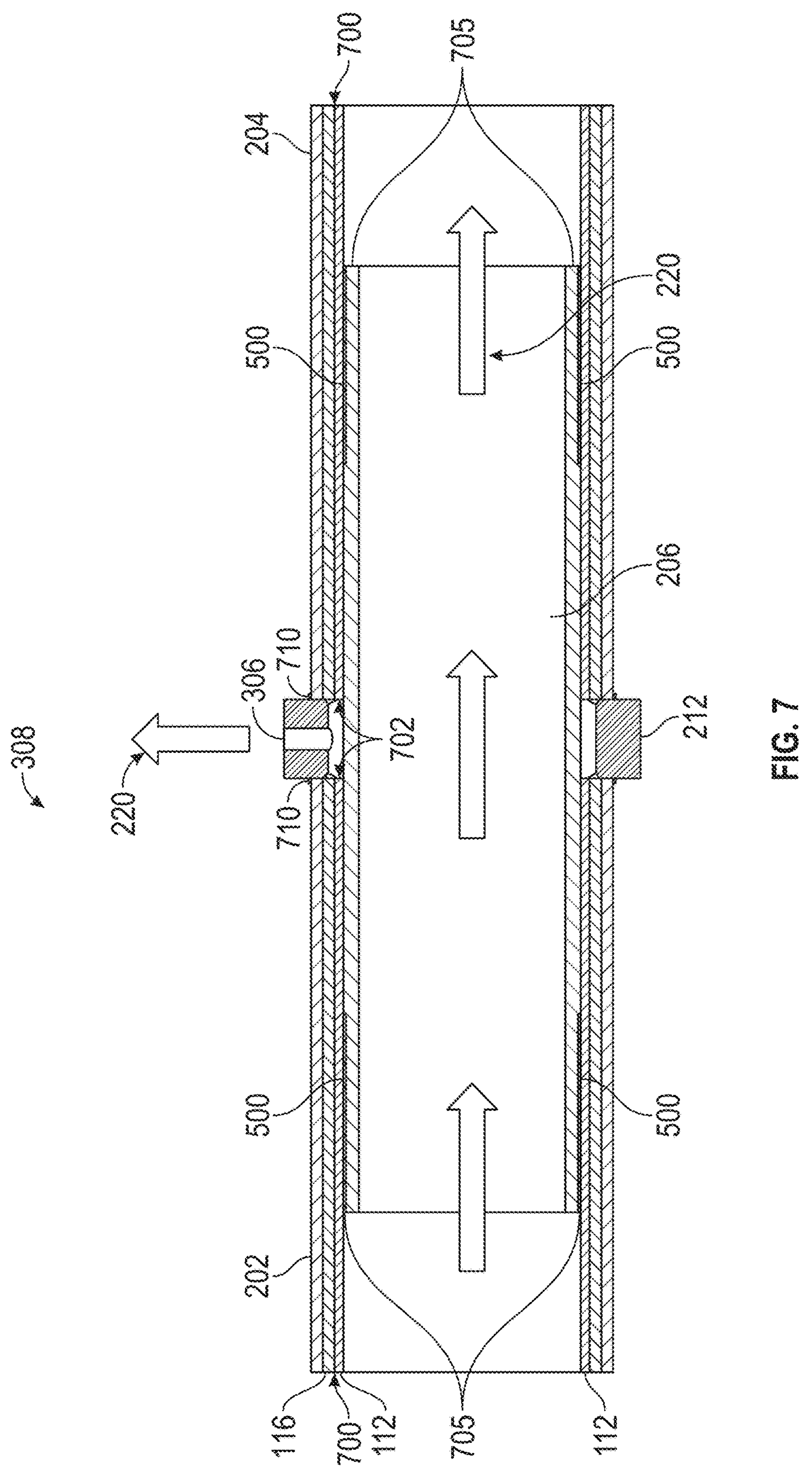
FIG. 7 shows a tight-fitting assembly step according to method of the present disclosure.

FIG. 7 shows an example connection system in a partially assembled configuration in accordance with one or more embodiments. As shown in FIG. 7, methods according to embodiments of the present disclosure include providing and positioning a coupler (206) internally between a first RTP pipe (202) and a second RTP pipe (204). As discussed in FIG. 1, the first and second RTP pipe (202, 204) includes an inner thermoplastic liner (e.g., inner thermoplastic liner (112)) and an external thermoplastic jacket (e.g., external thermoplastic jacket (116)). In some embodiments, an annulus (700) may be defined between the inner thermoplastic liner (112) and the external thermoplastic jacket (116). The annulus (700) may be considered the area where permeating fluids accumulate, for instance from the fluid flow path (220). In some embodiments, an area (702) may be defined between the first RTP pipe (202), the spacer (212), and the second RTP pipe (204). The area (702) may be considered an area where permeating fluids accumulate, for instance from the fluid flow path (220). The coupler (206) may be made of an fiber reinforced thermoset material, wherein a first end (505) and a second end (510) of the coupler each have a thermoplastic tie layer (500) provided around an outer surface of the coupler (206). The coupler (206) may be made of fiber reinforced thermoset material and non-metallic material. The thermoplastic tie layers (500) have a susceptor material (e.g., susceptor material (600)) incorporated. For example, a thin layer of susceptor material such as carbon fibers or copper wires may be deposited on top of a thermoplastic base layer to provide thermoplastic tie layers, or susceptor material may be dispersed within a thermoplastic matrix. Alternatively, the thermoplastic tie layer (500) may be deposited along a welding interface (705) between the coupler (206) and the inner thermoplastic liner (112) (forming an inner surface of the pipe) of the first and second RTP pipe (202,204), as shown in FIG. 8.

A spacer (212) is circumferentially installed around the coupler (206) so that the spacer (212) is between the first RTP pipe (202) and the second RTP pipe (204). The spacer (212) may be installed as a single ring or by connecting two or more segments as a ring using a bolt (312) or bond (314). The RTP pipe (202,204) may include multiple layers including but not limited to a fiber reinforcement layer layered around the inner thermoplastic liner (112) and the outer thermoplastic jacket (116) layered around the fiber reinforcement layer. The thermoplastic tie layers (500) may be made of the same thermoplastic material as the inner surfaces of the RTP pipe (202,204), or a thermoplastic material close enough in characteristics (e.g., melting temperature) to enable welding compatibility with the inner surfaces of the RTP pipe (202,204). According to embodiments of the present disclosure, the inner surfaces of the RTP pipe (202,204) and thermoplastic tie layers (500) may be cleaned (e.g., using alcohol) before tight fitting the coupler (206) and RTP pipe (202,204) together.

As shown in FIG. 7, the connection system (200), described in the previous embodiments, may include o-ring seals (710) positioned on opposite sides of the spacer (212) between the RTP pipe (202,204) to prevent ingress of external fluid. While o-ring sealing components are shown in FIG. 7, other sealing components may be used to prevent fluid ingress including, for example, a sealing compound such as grease. As described and shown in previous embodiments, the spacer (212) includes a perimetric channel (302) with connection chambers (304). A venting port (306) connecting one of the connection chambers (304) to an outside environment (308) is used to collect and canalize any leaked fluid (220) collected in the annulus (700) and/or area (702) via the venting port (306). The venting port (306) may be an instrumentation port (306) capable of sensing the leaked fluid (220). As indicated by the arrows in FIG. 7, the fluid (220) leaked and collected in the annulus (700) and/or area (702) may be expressed through one or more venting ports (306) in the spacer (212) into the outside environment (308). As described in detail throughout this disclosure, the venting port (306) may include or act as the instrumentation port to add sensing hardware or other functionalities. Additionally, the o-ring seals (710) may be included to ensure the leaked fluid (220) be safely retrieved via the venting port (306).

According to embodiments of the present disclosure, an RTR coupler integrating thermoplastic tie layers (including welding susceptors) on connection sides may be manufactured in a factory, such as described above, and then transported to an installation site, ready to be used. At the installation site, the RTP pipe ends may be tight fitted onto the "functionalized" RTR coupler to bring in close contact the thermoplastic inner surface of the RTP pipe to the thermoplastic tie layer bonded onto the RTR coupler, as shown in FIG. 6. The fitted-together "functionalized" RTR coupler and RTP pipes may be subsequently jointed by applying sufficient heat (e.g., by electrofusion, induction welding, resistive welding process, or other type of welding appropriate to thermoplastic welding) to melt and fuse the thermoplastic layers to each other. Upon cooling, a fully bonded and sealed joint is formed.

For example, as shown in FIG. 8, once the RTP pipe ends are in place with the coupler (206) positioned internally, an induction welding system (800) is provided around the fitted-together ends to melt, fuse, connect and seal the internal RTP liners (112) to the thermoplastic tie layers (500) on the first and second end (505,510) of the coupler (206). The induction welding system (800) may include an induction coil (805) wound around and spaced apart (e.g., a few millimeters) from the pipe outer surface (210) or pipe outer jacket if applicable. For example, induction coils may be encapsulated by a non-ferrous material (e.g., a plastic) to control the distance between the induction coils and the pipe and/or to make sure the coils stay coaxial to the pipe. Upon application of an electric current, a magnetic field is generated which induces an electric current in the susceptor material (e.g., susceptor material (600)) that will trigger (via Joule effect) heating of the susceptor material and melting of the surrounding thermoplastic materials (thermoplastic tie layer (500) and RTP inner thermoplastic liner (112)). After the induction process for thermoplastic welding is complete, the induction welding system (800) is removed.

After cooldown from thermoplastic welding, the thermoplastic weld between the RTP pipe (202,204) and the coupler (206) becomes effective, and the two RTP pipes (202,204) are sealed and coupled together.

According to embodiments of the present disclosure, after thermoplastic welding RTP pipe to a coupler, a mechanical connection system may be used to mechanically connect the RTP pipe to the coupler. In some embodiments, a mechanical connection system may include external ferrules and optional flanges that may be connected around the RTP pipe and connected to the coupler via connectors (e.g., bolts or screws).

Figure 9:
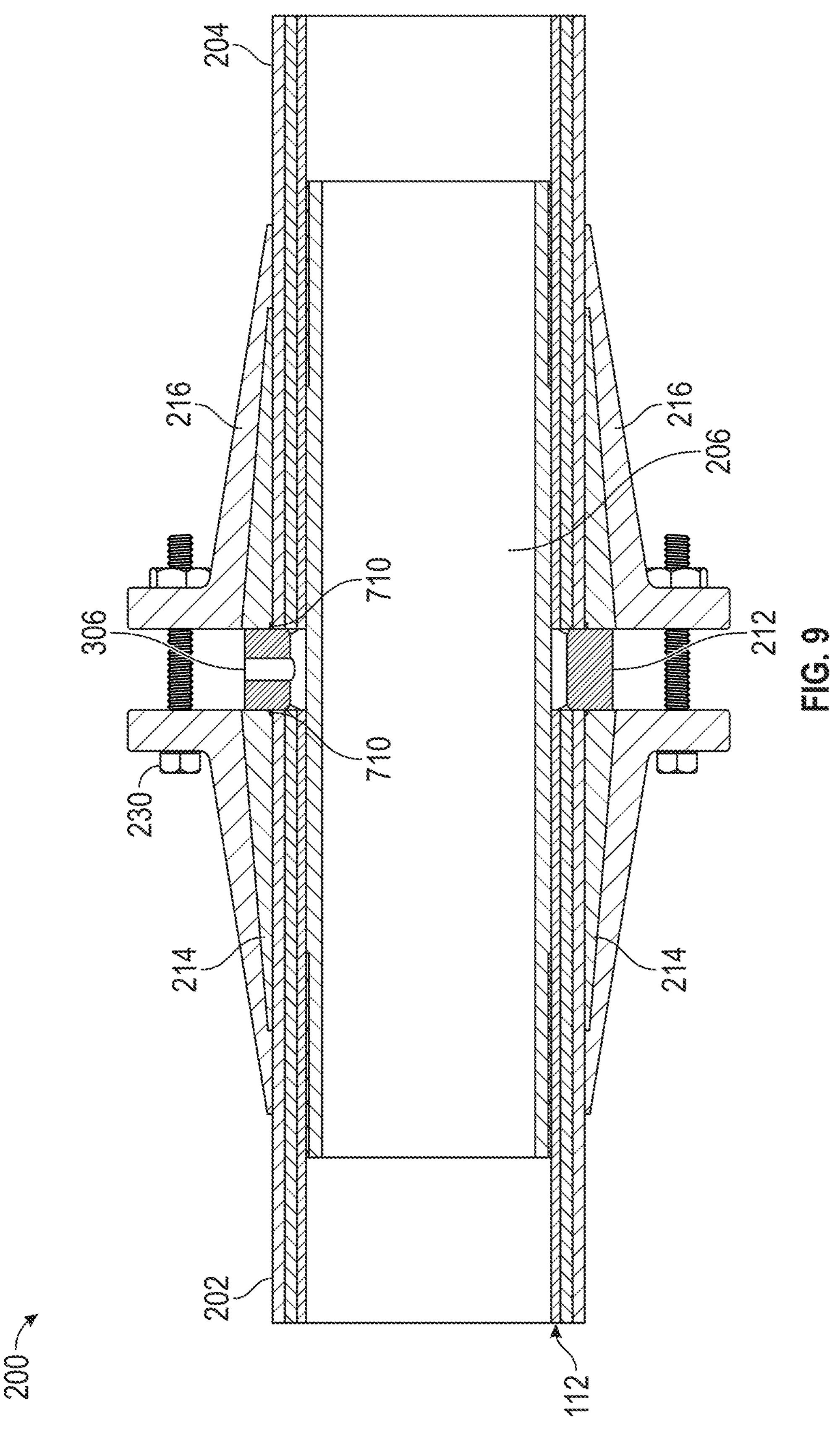
FIG. 9 shows an example of a mechanical connection step according to methods of the present disclosure.

For example, as shown in FIG. 9, after thermoplastic welding the RTP pipe (202,204) to the coupler (206), as shown in FIG. 8, the coupler/spacer/pipe thermoplastic connection is locked using a mechanical connection system that includes external ferrules (216) and wedges (214). The external ferrules (216) may include connecting a flange (225) on one of the external ferrules (216) to another flange (225) on the other external ferrule (216) via a connector (230). A set of wedges (214) is installed circumferentially around an outer surface (210) of each of the RTP pipe (202,204). The spacer (212) is disposed between the set of wedges (214) between each RTP pipe (202,204). The spacer (212), external ferrules (216), and wedges (214) may be made of reinforced polymer material, metallic material, or non-metallic material.

To make up the mechanical connection, a set of wedges is assembled circumferentially around an outer surface of the first RTP pipe (202) end, and another set of wedges is assembled circumferentially around the outer surface of the second RTP pipe (204) end. Various techniques may be used to hold wedges around the outer surface of the coupler/spacer/pipe connection until a flange may be properly fitted around the set of wedges. In some embodiments, wedges may be held circumferentially around a coupler/spacer/pipe connection outer surface using a temporary tacking or adhesive.

An external ferrule is then positioned around the set of wedges on the first RTP pipe (202) to sandwich the set of wedges between the external ferrule and the first RTP pipe (202), and another external ferrule around the other set of wedges to sandwich that set of wedges between the external ferrule and the second RTP pipe (204).

According to embodiments of the present disclosure, external ferrules or flanges may be slid onto the ends of the RTP pipe (in an orientation suitable for later connection around the RTR coupler) before tight fitting the RTP pipe to the coupler. By pre-installing the external ferrules around the RTP pipe ends, the external ferrules may be simply slid into position for connection around the coupler after the thermoplastic weld process. In other embodiments, a mechanical connection system may include flange segments or clamps, which may be assembled and tightened around the RTP pipe ends with or without wedges after the thermoplastic weld process.

Referring again to FIG. 9, after the wedges (214) are sandwiched between the RTP pipe (202,204) and the external ferrules (216), the external ferrules (216) are pushed toward each other to tighten the wedges (214) against the RTP pipe (202,204) and spacer (212) (via force transfer across the correspondingly sloped interfacing surfaces between the wedges and external ferrules). The first external ferrule is tightened against a first side of the spacer (212), and the second external ferrule is tightened against a second side of the spacer (212) using a series of connectors (230) (e.g., bolts, end caps, nuts, screws, etc.). For example, as shown, a bolt is inserted through a through-hole extending through the first external ferrule (216) and the second external ferrule (216), where nut(s) are tightened on the bolt to tighten the first and second external ferrule (216) against the spacer (212). Upon tightening, the external ferrules (216) exert a radial pressure over the regularly spaced wedges (214) (in the circumferential direction), which tightens the RTP pipe ends around the spacer (212). According to embodiments of the present disclosure, the internal surfaces of the wedges may be designed to have some roughness to prevent slippage between wedges and the RTP pipe.

During operation of the RTP pipe (202,204) after assembly, any leaked fluid (220) from the annulus (700) and/or area (702) is collected and canalized through the venting port (306) on the spacer (212). The leaked fluid (220) may be sensed using the venting port (306) as an instrumentation port as described in previous embodiments. The spacer (212) may include more than one venting ports (306), each connecting through one connection chamber (304) to the outside environment for collecting and canalizing leaked fluid (220).

According to embodiments of the present disclosure, coupler/spacer/pipe connections can be reversible, e.g., for pipe repairs or for re-use of the coupler or RTP pipe. A coupler/spacer/pipe connection may be disconnected by first disassembling any mechanical connection system around the coupler/spacer/pipe connection and then heating the coupler/spacer/pipe connection until the thermoplastic weld between the RTP pipe and the coupler melts, at which point the RTP pipe and the coupler may be pulled apart.

For example, the coupler/spacer/pipe connection shown in FIG. 9 may be disconnected by first disassembling the external ferrules (216) (by disconnecting the connectors (230)) and the wedges (214) from the connection. Heat may then be applied around the ends of the RTP pipe (202,204) to un-weld the thermoplastic weld (e.g., using the same induction welding system used to make the thermoplastic weld or a different heating system). The ends of the RTP pipe (202,204) may then be removed from the spacer (212) and the coupler (206). After disassembly, the coupler can re-used for the same purpose or the thermoplastic tie layers can be removed/machined and new thermoplastic tie layers deposited again.

Embodiments of the present disclosure may provide one or more of the following advantages.

Conventional metallic RTP connections offer good strength properties but ultimately corrode, which cause extra maintenance costs, and the sealing performance usually relies on o-rings, which require regular maintenance. Conventional non-metallic RTP connections may present good sealings properties, but limited pressure capacity due to the intrinsic weakness of common thermoplastic materials in terms of mechanical properties and durability. Alternatively, conventional non-metallic RTP connections can present good mechanical performance when relying on a fiber reinforced thermoset coupler, but the sealing capacity is limited by reliance on o-rings.

In contrast to the limitations of conventional RTP pipe connections, embodiments disclosed herein may provide optimal sealing performance due to the full thermoplastic circumferential seal obtained successively from friction welding (thermoplastic tie layer to a thermoset coupler) and thermoplastic welding (thermoplastic tie layer to the RTP pipe). Embodiments disclosed herein may also provide optimal mechanical performance as structural loads may be transferred via a thermoplastic interlayer between an RTR coupler and the RTP pipe liner and between the mechanical connection system (e.g., via wedges assembled around the outer jacket of the RTP pipe). The fiber reinforced thermoset (FRT) material of the RTR coupler can be designed to have sufficient strength to transfer the axial load.

Embodiments of the present disclosure may also reduce or eliminate corrosion risk since inner fluids flowing through the flow path formed through the RTP pipe and coupler are not in contact with any metallic part. Additionally, in embodiments using a mechanical connection system made with one or more or all non-metallic parts (e.g., RTR flanges, RTR wedges, etc.), the risk of corrosion around the exterior of the RTP pipe connection may also be reduced or eliminated. Additionally, by using connection systems according to embodiments of the present disclosure, the coupler can be easily dismantled via heating, e.g., for repair purpose or re-use. Embodiments of the present disclosure may also provide pipe joint condition monitoring and gas venting capabilities using the engineered spacer.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A connection system comprising:

a coupler disposed internally between a first pipe and a second pipe;

a set of wedges positioned circumferentially around an outer surface of each of the first pipe and the second pipe;

a spacer positioned circumferentially around the coupler and disposed between the set of wedges on the first pipe and the set of wedges on the second pipe;

an external ferrule disposed circumferentially around each set of wedges, wherein the spacer comprises a perimetric channel comprising a plurality of connection chambers; and a venting port connecting one of the plurality of connection chambers to an outside environment and is configured to collect and canalize any leaked fluid existing in an annulus between an inner thermoplastic liner and an external thermoplastic jacket of the first pipe and the second pipe or existing in an area between the first pipe, the spacer, and the second pipe, wherein the venting port defines an instrumentation port for sensing leaked fluid through the venting port.

2. The system of claim 1, wherein the first pipe and the second pipe comprise reinforced thermoplastic polymer pipe layers or thermoplastic composite pipe layers.

3. The system of claim 2, wherein the coupler comprises a first end and a second end weldable to the inner thermoplastic liner of the reinforced thermoplastic polymer pipe layers.

4. The system of claim 3, wherein the inner thermoplastic liner comprises a thermoplastic tie layer deposited along a welding interface between the coupler and the inner thermoplastic liner.

5. The system of claim 1, wherein the spacer comprises a single ring or two or more segments connectable as a ring via a bolt or bond.

6. The system of claim 1, further comprising:

a second venting port connecting another one of the plurality of connection chambers to the outside environment and is configured to collect and canalize the leaked fluid from the annulus through the second venting port.

7. The system of claim 1, wherein one of the external ferrules comprises a first flange configured to connect to a second flange on another external ferrule via a connector.

8. The system of claim 1, further comprising:

a seal component disposed between the spacer and the set of wedges configured to seal the outer surface, the seal component comprising an O-ring.

9. The system of claim 1, wherein the set of wedges, the external ferrules, and the spacer comprise a reinforced polymer material, a metallic material, or a non-metallic material.

10. The system of claim 1, wherein the coupler comprises a thermosetting resin and a non-metallic material.

11. A method for connecting a first pipe to a second pipe, the method comprising:

positioning a coupler internally between the first pipe and the second pipe;

installing a set of wedges circumferentially around an outer surface of each of the first pipe and the second pipe;

installing a spacer circumferentially around the coupler and between the set of wedges on the first pipe and the set of wedges on the second pipe, wherein the spacer comprises a perimetric channel comprising a plurality of connection chambers;

installing an external ferrule circumferentially around each of the set of wedges;

collecting and canalizing any leaked fluid existing in an annulus between an inner thermoplastic liner and an external thermoplastic jacket or existing in an area between the first pipe, the spacer, and the second pipe, via a venting port connecting one of the plurality of connection chambers to an outside environment; and sensing leaked fluid via the venting port, wherein the venting port defines an instrumentation port.

12. The method of claim 11, wherein the first pipe and the second pipe comprise reinforced thermoplastic polymer pipe layers or thermoplastic composite pipe.

13. The method of claim 12, further comprising:

welding a first end and a second end of the coupler to the inner thermoplastic liner of the reinforced thermoplastic polymer pipe layers.

14. The method of claim 13, further comprising:

depositing a thermoplastic tie layer along a welding interface between the coupler and the inner thermoplastic liner.

15. The method of claim 11, wherein installing the spacer comprises installing a single ring or connecting two or more segments as a ring via a bolt or bond.

16. The method of claim 11, wherein collecting and canalizing the leaked fluid comprises connecting a second venting port to another one of the plurality of connection chambers to the outside environment.

17. The method of claim 11, wherein installing the set of wedges comprises connecting a first flange on one of the external ferrules to a second flange on another external ferrule via a connector.

18. The method of claim 11, further comprising:

sealing the outer surface via a seal component between the spacer and the set of wedges comprising an O-ring.

19. The method of claim 11, wherein the set of wedges, the external ferrules, and the spacer comprise a reinforced polymer material, a metallic material, or a non-metallic material.

20. The method of claim 11, wherein the coupler comprises a thermosetting resin and a non-metallic material.

* * * * *